3,240,664
POLYAMINOUREYLENE - EPICHLOROHYDRIN RESINS AND USE IN FORMING WET STRENGTH PAPER
Ralph H. Earle, Jr., Claymont, Del., assignor to Hercules Powder Company, Wilmington, Del., a corporation of Delaware
No Drawing. Filed Feb. 3, 1964, Ser. No. 342,244
9 Claims. (Cl. 162—164)

This application is a continuation-in-part of application Serial No. 78,302, filed December 27, 1960, now abandoned.

This invention relates to water-solution alkaline-curing resins, to the preparation of same, and to their use in making wet-strength paper.

Many of the alkaline-curing wet-strength resins do not impart their maximum wet-strength properties until an aging period has elapsed. For some commercial applications it is desirable to obtain maximum wet-strength development "off-the-machine."

It has now been discovered that fast-curing, efficient water-soluble cationic thermosetting wet-strength resins may be prepared by reacting, under alkaline conditions, epichlorohydrin with polyaminoureylenes or polyaminothioureylenes containing tertiary amino nitrogens. These resins are alkaline curing and when used for the wet strengthening of paper cure faster on the machine and in storage than many of the alkaline-curing wet-strength resins. The new resins, moreover, are stable on the alkaline side, thereby reducing corrosion problems encountered in the handling and storing of some of the alkaline-curing resin solutions which require relatively low pHs for stabilization.

Having described the invention generally, the following examples are given to illustrate specific embodiments thereof.

EXAMPLE 1

A polyaminoureylene was prepared as follows: 145 grams of methyl bis(3-aminopropyl)amine (1.0 mole) and 60 grams of urea (1.0 mole) were placed in a 3-necked flask equipped with a thermometer, mechanical stirrer, condenser and nitrogen sparge tube. Nitrogen was bubbled slowly through the solution throughout the course of the reaction. The solution was heated to 140° C. over a 20-minute interval, where evolution of ammonia commenced. The solution was heated to 250° C. over a 30-minute interval and allowed to cool. The hard, resinous product was dissolved by gently agitating in water. The resulting solution contained 47.6% solids and had an intrinsic viscosity of 0.150 (2% solution in 1 N ammonium chloride).

A polyaminoureylene-epichlorohydrin resin, designated herein as "Resin A," was prepared as follows: 68.8 grams of the polyaminoureylene, prepared as above described, was dissolved in 110 grams of water and placed in a 250-ml., 3-necked flask equipped with a stirrer, thermometer and heating mantle. The pH was 11.0. The temperature was raised to 30° C. and 24.0 grams of epichlorohydrin was added over three minutes. The temperature was raised to 40° C. over a 47-minute period with no change in viscosity, then to 65° C. over a 42-minute period when the Gardner viscosity rose to <B. The solution was cooled to 25° C. The product contained 25.4% solids, had a Gardner viscosity of <B and a pH of 10.4. After four days the pH was 9.4 and the viscosity unchanged. After thirteen days the pH was 8.6 and the viscosity >B.

A second polyaminoureylene—epichlorohydrin resin, designated herein as "Resin B," was prepared as follows: 68.8 grams of the polyaminoureylene, prepared as above described, was dissolved in 110 grams of water and placed in a 250-ml., 3-necked flask equipped with a stirrer, thermometer and heating mantle. The pH was 10.8. The temperature was raised to 45° C. and 24.0 grams of epichlorohydrin was added over a two-minute period. The temperature was raised to 50° C. for 100 minutes, at which time the Gardner viscosity was C. The reaction mixture was cooled to 25° C. It contained 24.0% solids, had a Gardner viscosity of C, and a pH of 9.3. After one day the pH was 9.6 and the viscosity <B. The pH was adjusted to 7.0 with sulfuric acid. The viscosity was <B. After one day the pH rose to 9.0 and the viscosity was >B.

An alkaline-curing control resin, designated herein as "Resin C," was prepared as follows: Into a 1-liter, 3-necked, round-bottom flask fitted with mechanical stirrer, thermometer and distilling condenser was placed 200 grams (1.94 moles) of diethylenetriamine and 100 grams of water. The flask was flushed with nitrogen and kept under a nitrogen blanket throughout the reaction. To the well-stirred mixture was added, in six approximately equal portions, 290 grams (2.00 moles) of adipic acid. After the acid had dissolved in the amine, the solution was heated to 190±5° C. and held there for 1.5 hours. The reaction mixture was then cooled to 140° C. and diluted with 430.0 grams of water. The polyamide solution contained 53.8% solids and had an intrinsic viscosity (2% solution in 1 N ammonium chloride) of 0.116.

To 234 grams (126 grams dry basis) of this polyamide solution in a round-bottom flask was added 456 grams of water. The pH was adjusted to 8.5 with 2.2 ml. of concentrated sulfuric acid. The flask was then fitted with a mechanical stirrer and thermometer. The solution was heated with stirring to 50° C. and 62 grams of epichlorohydrin was added during a period of two minutes. The solution was heated to 65° C. and held until a Gardner-Holdt viscosity of >B was obtained (1 hour, 32 minutes). It was then cooled to 25° C. and adjusted to pH 2.0 with concentrated sulfuric acid. The product contained 24.6% solids (105° C. oven for 3 hours) and had a Gardner viscosity of >D.

Resins A, B and C were evaluated as wet-strength resins in paper in the following manner. Tacoma bleached kraft pulp was beaten to a Schopper-Riegler freeness of 750 cc. in a Noble and Wood cycle beater. The pH of the pulp was 7.5–7.8. To this pulp was added various percentages by weight, based on the weight of dry pulp, of resins A, B and C. The pulp was sheeted on a Noble and Wood handsheet machine using a closed system. The white water contained 50 p.p.m. sulfate ion and had been adjusted to 7.5 with sodium bicarbonate solution. The resulting handsheets were run through press rolls and then drum dried according to the usual procedure. Portions of the resulting handsheets were cured for one hour at 105° C. The sheets tested for wet strength were soaked for two hours in distilled water. Results are listed in the following table.

| Resin | Percent Resin Added | Wet Tensile (lb./in. width) | |
|---|---|---|---|
| | | Uncured | Cured |
| A | 0.4 | 4.9 | 7.5 |
| | 1.0 | 7.7 | 10.8 |
| | 2.0 | 9.1 | 11.6 |
| B | 0.4 | 5.6 | 8.2 |
| | 1.0 | 8.9 | 11.4 |
| | 2.0 | 10.3 | 12.8 |
| C | 0.4 | 4.1 | 8.1 |
| | 1.0 | 5.7 | 11.4 |
| | 2.0 | 7.6 | 13.6 |

The wet tensile in the column of the above table headed "Uncured" corresponds to the "off-the-machine" wet strength. As will be evident, the "off-the-machine" wet strength developed by resins A and B of the invention was substantially greater, in each case, than the "off-the-machine" wet strength developed by the control resin C.

The polyaminoureylenes or polyaminothioureylenes contemplated for use in the preparation of the alkaline-curing, cationic thermosetting resins of the invention are water-soluble materials containing tertiary amine groups and/or mixtures of tertiary amine groups with primary and/or secondary amine groups and/or quaternary ammonium groups. However, tertiary amine groups should account for at least 70% of the basic nitrogen groups present in the polyaminoureylene or polyaminothioureylene. These polyaminoureylenes or polyaminothioureylenes may be prepared by reacting urea or thiourea with certain polyamines containing tertiary amine groups. The reaction can, if desired, be carried out in a suitable solvent such as xylene.

The polyamine reactant should have at least three amine groups, at least one of which is a tertiary amine group. It may also have secondary amine groups in limited amounts. Typical polyamines of this type suitable for use as hereinabove described are methyl bis(3-aminopropyl)amine, methyl bis(2-aminoethyl)amine, N-(2 - aminoethyl)piperazine, 4,7 - dimethyltriethylenetetramine and so on, which can be obtained in reasonably pure form, as well as crude mixtures containing one or more of such materials.

The temperatures employed for carrying out the reaction between the urea or thiourea and the polyalkylene polyamine may vary from about 125° C. to about 250° C. at atmospheric pressure. For most purposes, however, temperatures between about 175° C. and about 225° C. have been found satisfactory and are preferred. The time of reaction will vary depending upon temperatures, etc., but will usually be from about ½ hour to about 4 hours. In any event, the reaction is desirably continued to substantial completion for best results.

In carrying out the reaction between the urea or thiourea and the polyamine, it is preferred to use a mole ratio of polyamine to urea or thiourea of about 1:1. However, mole ratios from about 0.7:1 to about 1.5:1 can be used and are contemplated as within the scope of the invention. Mole ratios outside these ranges are generally unsuitable for the purposes herein described.

In converting the polyaminoureylene or polyaminothioureylene, formed as above described, to a cationic thermosetting resin, it is reacted with epichlorohydrin at a temperature from about 25° C. to about 80° C., and preferably at a temperature from about 35° C. to about 50° C., until the viscosity of a 25% solids solution at 25° C. has reached about B or higher on the Gardner-Holdt scale. This reaction is preferably carried out in aqueous solution at solids concentrations from about 20% to about 50% to moderate the reaction. The reaction may also be moderated by decreasing the pH of the aqueous polyaminoureylene solution with acid prior to addition of epichlorohydrin or immediately after the addition of epichlorohydrin. This adjustment is usually made to pH 8.5-9.5 but may be made to as low as pH 7.5 in some cases with quite satisfactory results.

When the desired viscosity is reached, the product is cooled to about 25° C. Since the product is stable on both the acid and alkaline sides, pH adjustment is not necessary. However, if desired, the pH may be adjusted to at least as low as 7.0 by the addition of sulfuric or other acid.

In the polyaminoureylene—epichlorohydrin or polyaminothioureylene—epichlorohydrin reaction, it is preferred to use a mole ratio of epichlorohydrin to free amine groups in the polyaminoureylene or polyaminothioureylene from about 1.0:1 to about 1.7:1. However, more or less may be added to moderate or increase reaction rates. In general, satisfactory results may be obtained utilizing from about 0.8 mole to about 2.0 moles of epichlorohydrin for each free amine group of the polyaminoureylene or polyaminothioureylene.

The cationic polyaminoureylene—epichlorohydrin or polyaminothioureylene—epichlorohydrin resins, prepared as herein described, may be applied to paper or other felted cellulosic products by tub application or by spraying, if desired. Thus, for example, preformed and partially or completely dried paper may be impregnated by immersion in, or spraying with, an aqueous solution of the resin, following which the paper may be heated for about 0.5 to 30 minutes at temperatures of 90° C. to 100° C. or higher to dry same and cure the resin to a water-insoluble condition. The resulting paper has greatly increased wet strength and therefore this method is well suited for the impregnation of paper towels, absorbent tissue and the like, as well as heavier stocks such as wrapping paper, bag paper and the like, to impart wet strength characteristics thereto.

The preferred method of incorporating these resins in paper, however, is by internal addition prior to sheet formation, whereby advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner, the "off-the-machine" wet strength, as previously indicated, being relatively high as compared with other types of alkaline-curing wet-strength resins.

In some commercial applications the "off-the-machine" wet strength obtained with the cationic resins of the invention is ample and further curing is not necessary. However, in those commercial applications where additional wet strength is desired, the paper may be subjected to a heat treatment for about 10 to 60 minutes at a temperature of about 105° C. to about 150° C. Additional wet strength may also be gained by allowing the paper to age under the normal paper storage conditions.

The cationic thermosetting resins herein disclosed impart wet strength to paper when present therein in any measurable amount, i.e., about 0.01% or more, based on the dry weight of the paper. Generally, it will be desirable to use from about 0.1–3% by weight, based on the dry weight of the fiber. However, amounts up to 5% or more by weight, based on the dry weight of the fiber, can be used for special effects.

While the novel resins of the invention have been specifically described and exemplified in connection with their use as wet-strength resins for paper, they are also useful for various other purposes such as flocculating agents for colloidal and other suspensions and retention aids for various impregnated coatings or other agents utilized in the treatment or formation of paper.

What I claim and desire to protect by Letters Patent is:

1. A process of preparing a cationic thermosetting resin which comprises reacting a material selected from the group consisting of urea and thiourea with a polyamine containing at least three amine groups, at least one of which is a tertiary amine group in a mole ratio of the latter to the former from about 0.7:1 to about 1.5:1 to form a material selected from the group consisting of a polyaminoureylene and a polyaminothioureylene containing free amine groups, at least 70% of which are tertiary amine groups, and then reacting, under alkaline reaction conditions, the material selected from the group consisting of a polyaminoureylene and a polyaminothioureylene with epichlorohydrin in a mole ratio of epichlorohydrin to free amine groups in the material selected from the group consisting of a polyaminoureylene and a polyaminothioureylene of from about 1.0:1 to about 1.7:1 to form a cationic thermosetting resin.

2. A process according to claim 1 in which the polyamine is methyl bis(3-aminopropyl)amine.

3. A process according to claim 1 in which the polyamine is methyl bis(2-aminoethyl)amine.

4. A process according to claim 1 in which the polyamine is N-2(aminoethyl)piperazine.

5. A process according to claim 1 in which the polyamine is 4,7-dimethyltriethylenetetramine.

6. The product produced in accordance with the process of claim 1.

7. A process of preparing wet-strength paper which comprises incorporating therein from about 0.1% to about 5.0% by weight, based on the weight of paper, of a cationic thermosetting resin, said resin comprising a water-soluble reaction product of epichlorohydrin and a material selected from the group consisting of a polyaminoureylene and a polyaminothioureylene containing free amine groups, at least 70% of which are tertiary amine groups, the mole ratio of epichlorohydrin to free amine groups being from about 1.0:1 to about 1.7:1, said material selected from the group consisting of a polyaminoureylene and a polyaminothioureylene being obtained by reacting a material selected from the group consisting of urea and thiourea with a polyamine containing at least three amine groups, at least one of which is a tertiary amine group, in a mole ratio of the latter to the former of from about 0.7:1 to about 1.5:1, the said water-soluble reaction product being derived under alkaline reaction conditions.

8. A process of producing wet-strength paper which comprises adding to an aqueous suspension of cellulosic paper stock from about 0.01% to 5% by weight based on the dry weight of the paper of a water-soluble cationic thermosetting resin formed by reacting, under alkaline reaction conditions, epichlorohydrin and a material selected from the group consisting of a polyaminoureylene and a polyaminothioureylene containing free amine groups, at least 70% of which are tertiary amine groups, the ratio of epichlorohydrin to free amine groups being from about 1.0:1 to about 1.7:1, said material selected from the group consisting of a polyaminoureylene and a polyaminothioureylene being obtained by reacting a material selected from the group consisting of urea and thiourea with a polyamine containing at least three amine groups, at least one of which is a tertiary amine group, in a mole ratio of the latter to the former of from about 0.7:1 to about 1.5:1 about 1.5:1.

9. A paper product having improved wet strength comprising sheeted cellulosic fibers containing from about 0.1% to 5% by weight, based on the dry weight of fibers, of a cationic thermosetting resin, said resin comprising a water-soluble reaction product of epichlorohydrin and a material selected from the group consisting of a polyaminoureylene and a polyaminothioureylene containing free amine groups, at least 70% of which are tertiary amine groups, the ratio of epichlorohydrin to free amine groups being from about 1.0:1 to about 1.7:1, said material selected from the group consisting of a polyaminoureylene and a polyaminothioureylene being obtained by reacting a material selected from the group consisting of urea and thiourea with a polyamine containing at least three amine groups, at least one of which is a tertiary amine group, in a mole ratio of the latter to the former of from about 0.7:1 to about 1.5:1 the said water-soluble reaction product being derived under alkaline reaction conditions.

References Cited by the Examiner
UNITED STATES PATENTS

| | | | |
|---|---|---|---|
| 2,304,369 | 12/1942 | Morgan et al. | 260—77.5 |
| 2,699,435 | 1/1955 | Auten | 260—77.5 |
| 2,764,601 | 9/1956 | Garceau | 260—77.5 |
| 2,926,154 | 2/1960 | Keim | 162—164 |

DONALL H. SYLVESTER, *Primary Examiner.*